United States Patent [19]

Langton

[11] Patent Number: 5,326,163
[45] Date of Patent: Jul. 5, 1994

[54] DITHER APPARATUS

[75] Inventor: Richard G. Langton, Shoreview, Minn.

[73] Assignee: Honeywell Inc., Minneapolis, Minn.

[21] Appl. No.: 698,641

[22] Filed: May 10, 1991

[51] Int. Cl.$^5$ .............................................. G01B 9/02
[52] U.S. Cl. ............................................... 356/350
[58] Field of Search ..................... 356/350; 372/94; 310/317, 323

[56] References Cited

U.S. PATENT DOCUMENTS

| | | | |
|---|---|---|---|
| 3,503,688 | 3/1970 | Lechevalier | 356/106 |
| 4,309,107 | 1/1982 | McNair et al. | 356/350 |
| 4,349,183 | 9/1982 | Wirt et al. | 267/160 |
| 4,597,667 | 7/1986 | Curby et al. | 356/350 |
| 4,653,918 | 3/1987 | Stjern et al. | 356/350 |
| 4,710,027 | 12/1987 | Fersht et al. | 356/350 |
| 4,711,575 | 12/1987 | Butler | 356/350 |
| 4,751,718 | 6/1988 | Hanse et al. | 372/94 |
| 4,801,206 | 1/1989 | Benoist | 356/350 |
| 4,856,901 | 8/1989 | Ferriss et al. | 356/350 |

OTHER PUBLICATIONS

Marketing Brochure, "Trilag Third Generation RLG", Kearfott division of Singer Company.

Primary Examiner—Mark Hellner
Attorney, Agent, or Firm—Ronald Champion

[57] ABSTRACT

A dither motor reed apparatus for use in a dither motor which includes a hub member and an outer support housing. The dither motor reed apparatus has a robust inner section having a hub end and a first joining end and an outer section which is more limber than the robust inner section. The hub end of the robust inner section is rigidly affixed to the hub member. The outer section of the reed has a support end and a second joining end. The outer section's second joining end is integrally affixed to the robust inner section's first joining end and the support end is rigidly affixed to the outer support housing of the dither motor. Piezoelectric elements are affixed to the dither motor reed apparatus and the construction of the reeds significantly reduces stresses on those elements.

15 Claims, 2 Drawing Sheets

DITHER APPARATUS

FIELD OF THE INVENTION

This invention relates generally to rotation sensors and particularly to ring laser gyroscope rotation sensors. Still more particularly, this invention relates to a dither motor including a dither motor reed structured to protect oscillation drive elements, such as, for example, piezoelectric elements, from high stresses when used for dithering ring laser gyroscopes.

RELATED APPLICATIONS

This application is related to the present assignee's copending application Ser. No. 07/684,613 now U.S. Pat. No. 5,173,745, filed Apr. 12, 1991, to Hanse entitled CLUSTER DITHER APPARATUS AND METHOD.

BACKGROUND OF THE INVENTION

Ring laser angular rate sensors, often also called ring laser gyros, are well known. One example of a ring laser angular rate sensor is U.S. Pat. No. 4,751,718 issued to Hanse, et al., which is incorporated herein by reference thereto. Present day ring laser angular rate sensors include a thermally and mechanically stable laser block having a plurality of formed cavities for enclosing a gap. Mirrors are placed at the extremities of the cavities for reflecting laser beams and providing an optical closed-looped path.

Associated with such sensors is an undesirable phenomenon called lock-in which has been recognized for some time in the prior art. In the prior art, the lock-in phenomenon has been addressed by rotationally oscillating such sensors. The rotational oscillation is typically provided by a dither motor. Dither motors of the prior art usually have a suspension system which includes, for example, an outer rim, a central hub member and a plurality of three dither motor reeds which project radially from the hub member and are connected between the hub member and the rim. Conventionally, a piezoelectric element which serves as an actuator is connected to the suspension system. The suspension system comprises a dither motor which causes the block of the sensor to oscillate angularly at the natural mechanical resident frequency of the suspension system. This dither motion is superimposed upon the actual rotation of the sensor in inertial space. Such dither motors may be used in connection with a single ring laser gyro, or to dither multiple ring laser gyros. The prior art includes various approaches to recover inertial rotation data free from dither effects.

Certain applications of such ring laser gyros require exposure to severe environments. For example, ring laser gyros may be employed in airborne vehicles or devices which are subjected to extremely high gravitational forces, also called g forces herein. Such high gravitational forces may be on the order of about 14,000 g's. Gravitational forces of such high magnitude subject the piezoelectric elements to extremely high stresses. Unfortunately, such piezoelectric elements are brittle and will fracture or depolarize when subjected to such extremely high stresses, causing the ring laser gyro to malfunction.

Dither motors in the prior art are typically directed toward dithering a single ring laser gyro with a single dedicated dither motor imbedded in the hub of each ring laser gyro. Examples of such systems include U.S. Pat. No. 4,653,918 to Stjern, et al. and U.S. Pat. No. 4,349,183 to Wirt, et al., as well as the Hanse '718 ring laser gyro.

Dither motors for dithering multiple ring laser gyro beams within an integral ring laser gyro block are also known. For example, U.S. Pat. No. 3,503,688 to LeChevalier, entitled "Multiple Axis Laser Angular Rate Sensor", discloses a solid block support apparatus which supports three sets of counter rotating laser beams traveling along triangular paths. A shaft and block are vibrated or dithered about the axis of the shaft by a single mechanical dithering means. Components of the dither are presented to each triangular path and all three of the triangular paths are simultaneously dithered.

U.S. Pat. No. 4,856,901 to Ferris, et al., entitled "Velocity Control System Using Piezoelectric Transducers", discloses a design strikingly similar to the dither concept used in the LeChevalier '688 patent. Three ring laser gyro paths integrated into a solid block are mechanically dithered by a single dither mechanism through a cube diagonal. The present invention, in contrast, is a device for simultaneously dithering three discrete ring laser gyros each of polygonal shape and does not require an integrated solid block construction as in the '688 patent. Thus, the present invention allows the construction of smaller ring laser gyro packages using discrete ring laser gyros. This avoids the complexities and expense of fabricating a single three gyro block.

Other art provides various dither schemes. U.S. Pat. No. 4,801,206 to Benoist, entitled "Simplified Ring Laser Gyroscope Dither Control and Method", is also directed to a dither mechanism. A dither flexor is mounted between a ring laser gyroscope body and a support such that the ring laser gyroscope may be dithered to have angular oscillations about a sensing axis.

U.S. Pat. No. 4,711,575 to Butler, entitled "Non-pendulous Counter-Balance Dither Mechanism For Laser Gyro", discloses a laser gyro dither mechanism utilizing a three spring suspension system.

U.S. Pat. No. 4,710,027 to Fersht, et al., entitled "Method and Apparatus for Mechanical Dither Stabilization Of A Laser Angular Sensor", discloses an apparatus whereby one, two, three or four dither mechanisms selectively may be simultaneously energized. The '027 patent is directed to individual dithering means connected to each of at least three ring laser gyros which are selectively energized.

U.S. Pat. No. 4,653,918 to Stjern, et al., entitled "Low Q Body-Dithered Laser Gyro Assembly", discloses a low Q ring laser gyro dither motor assembly.

U.S. Pat. No. 4,597,667 to Curby, et al., entitled "Dither Controller For Ring Laser Angular Rotation Sensor" discloses a dithering apparatus which is inserted into the hub of a ring laser gyro. The mechanism includes a pickoff sensor to measure parameters relating the sensor body position to a support means.

U.S. Pat. No. 4,349,183 to Wirt, et al., entitled "Spring For A Ring Laser Gyro Dither Mechanism", discloses a flexure spring assembly for a ring laser gyro dither mechanism using flexure springs between the hub and the rim. Each spring is driven by four piezoelectric crystal wafers.

U.S. Pat. No. 4,309,107 to McMere, et al., entitled "Laser Gyro Dither Mechanism", discloses a laser gyro dither mechanism utilizing a three-spring suspension system.

The dither motor reed apparatus provided by the instant invention offers significant advantages over the prior art schemes. One advantage is that the invention allows the fabrication of inertial measurement units in a package volume which is smaller than the packaging volume generally available with prior art schemes and which can withstand extreme shock.

SUMMARY OF THE INVENTION

A dither motor reed apparatus for use in a dither motor is provided in accordance with the present invention. The dither motor includes a hub member and an outer support housing. The dither motor reed apparatus comprises a robust inner section having a hub end and a first joining end, wherein the hub end is rigidly affixed to the hub member, and an outer section which is more limber than the robust inner section. The outer section has a support end and a second joining end. The second joining end is integrally affixed to the robust inner section's first joining end and the support end is rigidly affixed the outer support housing of the dither motor.

In another aspect of the invention, means for oscillation of the dither motor is rigidly affixed to the robust inner section of the dither motor reed apparatus. The oscillation means may advantageously comprise at least two piezoelectric elements mounted to opposing sides of the robust inner section.

In yet another aspect of the invention, a dither motor apparatus, including a hub and an outer support housing, is provided. The dither motor apparatus comprises a plurality of reeds, each reed having a robust inner section having a hub end, and an integrally connected outer section having a support end. The hub ends of each robust inner section are connected to a common hub and the support ends of each outer section are connected to the outer support housing. The plurality of reeds are arranged to be disposed at equal angles from each other extending radially outwardly from the hub. Each reed has a means for oscillating connected thereto. A plurality of mounting supports extend outwardly from the hub. Each mounting support is located between two of the reeds.

Other objects, features and advantages of the present invention will become apparent to those skilled in the art through the Description of the Preferred Embodiment, Claims, and drawings herein wherein like numerals refer to like elements.

DETAILED DESCRIPTION OF THE PREFERRED EMBODIMENT

Figure 1:
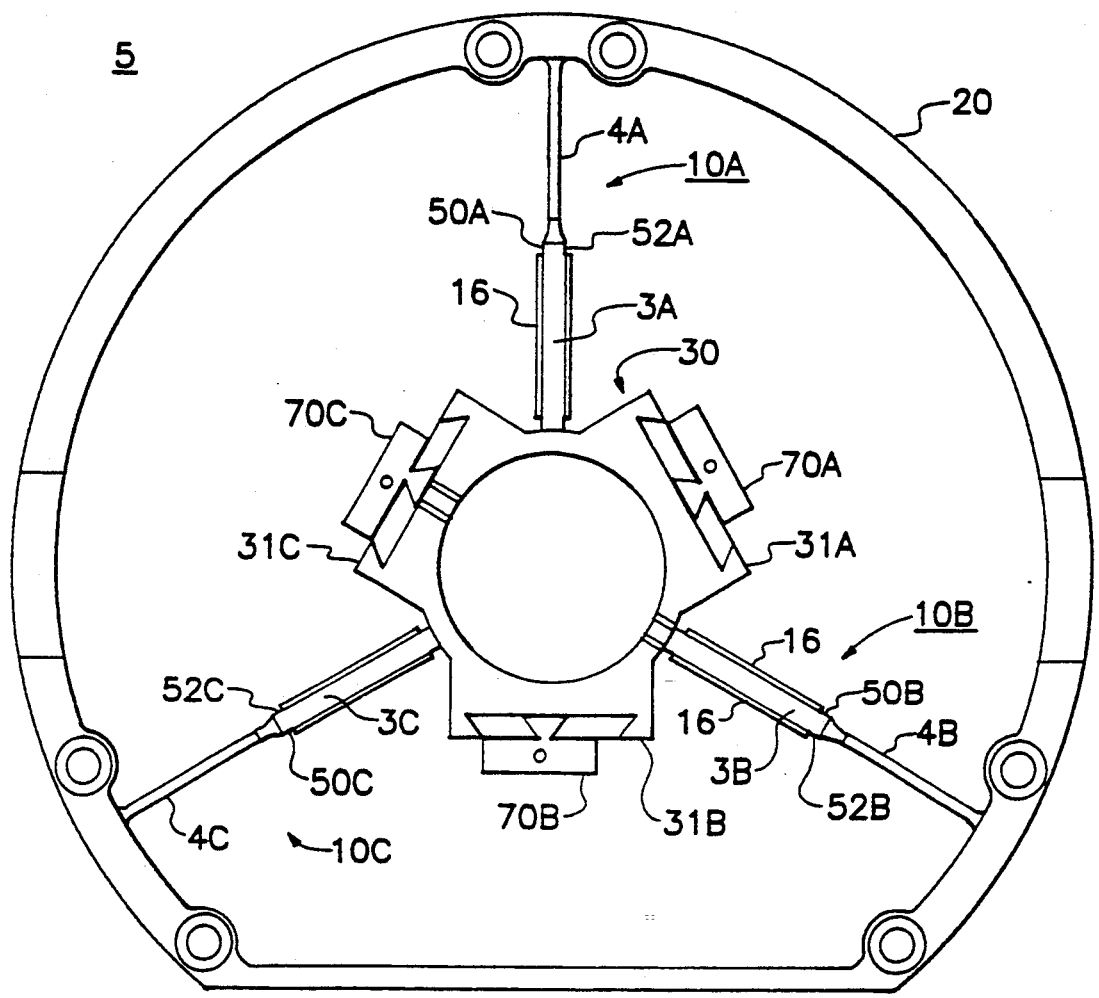
FIG. 1 schematically shows a top view of a dither motor including a plurality of dither motor reeds constructed in accordance with one aspect of the invention.

FIG. 1 schematically shows a top view of a dither motor 5 including a plurality of dither motor reeds 10A, 10B and 10C constructed in accordance with one aspect of the invention. The dither motor 5 includes a hub member 30 and an outer support housing 20. In one aspect of the invention intended for use as a cluster dither, the hub member 30 may further advantageously include a plurality of mounting supports 31A, 31B and 31C. The plurality of mounting supports 31A, 31B and 31C may advantageously be integral with the hub member 30. A plurality of dither motor reeds 10A, 10B and 10C extend radially between the hub member 30 and the outer support housing 20. Each dither motor ring has a robust inner section 3A, 3B and 3C and a more limber outer section 4A, 4B and 4C. Each inner section has a first opposing surface 50A, 50B and 50C and a second opposing surface 52A, 52B and 52C. Means 16 for oscillation of the plurality of dither motor reeds 10A, 10B and 10C are affixed to opposing surfaces 50A, 52A through 50C, 52C of the robust inner sections 3A-3C.

In the example embodiment of the invention shown in FIG. 1, a plurality of inertial measurement units such as, for example, ring laser gyros 70A, 70B and 70C may be mounted to the plurality of mounting supports 31A, 31B and 31C in a well known manner. The ring laser gyros 70A-70C may be of the type as described in U.S. Pat. No. 4,751,718 which is assigned to the same assignee as the present invention. The ring laser gyros are advantageously polygonal in shape and may typically have square or triangular blocks.

Figure 2:
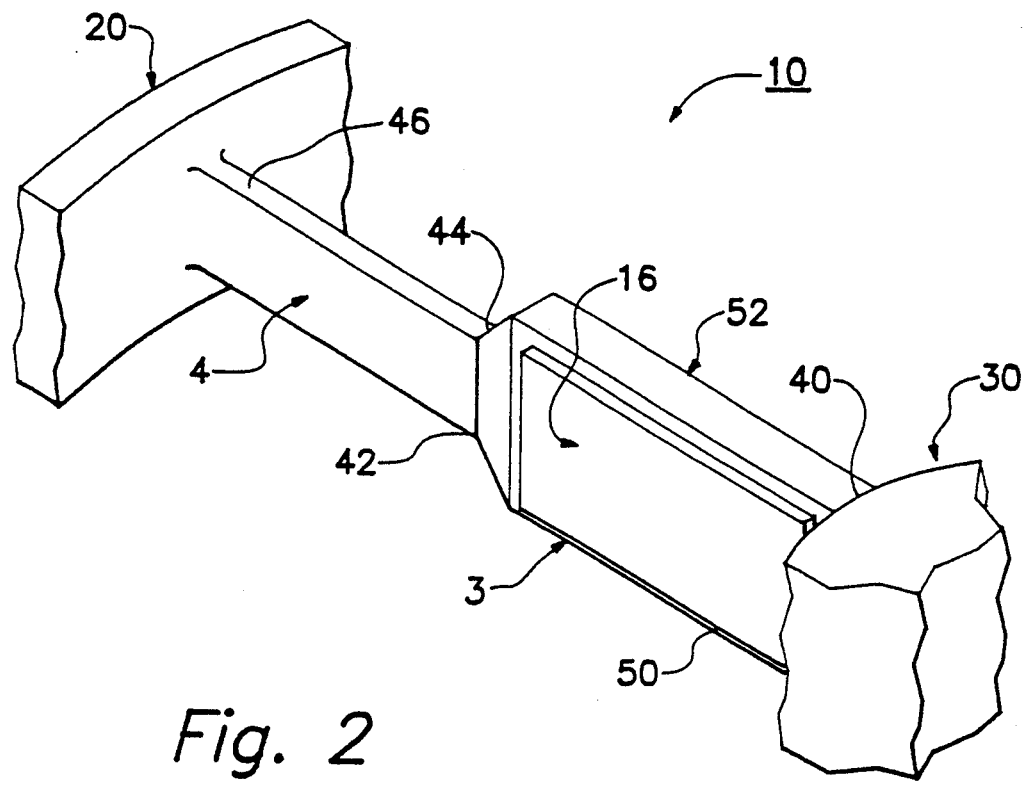
FIG. 2 shows in detail, one embodiment of a dither motor reed apparatus of the invention.

As best shown in detail in FIG. 2, each of the plurality of dither motor reeds 10 comprises a robust inner section 3 and an outer section 4 which is more limber than the robust inner section 3. The robust inner section has a hub end 40 and a first joining end 42. The hub end 40 is advantageously rigidly affixed to the hub member 30, and may be integral therewith. The outer section 4 has a support end 46 and a second joining end 44. The outer section's second joining end 44 is integrally affixed to the robust inner section's first joining end 42 and the support end 46 is rigidly affixed to the outer support housing 20 of the dither motor 5. The oscillation means 16 mounted on opposing surfaces 50, 52 of the robust inner section 3 may advantageously comprise piezoelectric elements.

In operation, the piezoelectric elements 16, for example, may be polarized such that application of a driving signal (not shown) applied across it in a well known manner causes the piezoelectric element to selectively expand or contract. The piezoelectric element 16 on an opposing surface is also polarized and has a pair of opposing electrodes (not shown) connected thereto. The piezoelectric elements 16 on opposing sides 50, 52 may have opposite polarities so that application of the same driving signal thereto causes one element on a first opposing side to expand while another element on the corresponding second opposing side contracts. If the elements on opposing surfaces 50, 52 have the same polarities, then the driving voltages must have opposite polarities in order to achieve the desired effect of alternately expanding and contracting. The piezoelectric elements affixed to each of the plurality of dither motor reeds have substantially identical polarities and driving voltages. Therefore, if the piezoelectric elements on surfaces 50A, 50B and 50C contract while the piezoelectric elements on surfaces 52A, 52B and 52C expand, reeds 10 will deform so that the dither motor 5 rotates about the hub member 30. A change in sign of the driving signal causes an opposite direction rotation or dithering motion of the dither motor. This dithering motion is then passed through the reeds 10 onto the ring laser gyros 70A-70C, thereby preventing the ring laser gyro "lockin" condition.

Piezoelectric elements of the type used for oscillation means 16 in practicing the invention are brittle and will fracture or depolarize when subjected to high stresses. The construction of the dither motor reeds 10 in accordance with the teachings of the present invention significantly reduces stresses on the piezoelectric elements, particularly when the piezoelectric elements are exposed to severe environments. In one test conducted by Honeywell Inc. of Minneapolis, Minn., reasonable dither performance was maintained on a cluster dither device fabricated in accordance with the invention up to 14,000 g's The robust inner section 3 and the more limber outer section 4 must be selected to significantly reduce stress on the piezoelectric elements, while at the same time providing reasonable dither performance (i.e. substantially eliminating lockin). The members should be proportioned to the size of piezoelectric elements used as well as the size of ring laser gyro being employed.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A dither motor reed apparatus for use in a dither motor, the dither motor including a hub member and an outer support housing, wherein the dither motor reed apparatus comprises:
   (a) a robust inner section having a hub end and a first joining end, wherein the hub end is rigidly affixed to the hub member; and
   (b) an outer section which is more limber than the robust inner section, wherein the outer section has a support end and a second joining end, wherein the second joining end is integrally affixed to the first joining end of the robust inner section, and wherein the support end is rigidly affixed to the outer support housing.

2. The apparatus of claim 1 further including means for oscillation of the dither motor rigidly affixed to the robust inner section of the dither motor reed apparatus, wherein the robust inner section and the outer section cooperate to reduce stress on the oscillation means while still providing dithering effects.

3. The apparatus of claim 2 wherein the oscillation means comprises at least two piezoelectric elements.

4. A dither motor apparatus, including a hub and an outer support housing, comprising:
   (a) a plurality of reeds, each reed having a robust inner section having a hub end and an integrally connected outer section having a support end, wherein the hub ends of each robust inner section are connected to the dither motor hub and the support ends of each outer section are connected to the outer support housing, wherein the plurality of reeds are arranged to be disposed at equal angles from each other extending radially outwardly from the hub and wherein each reed has a means for oscillating connected thereto; and
   (b) a plurality of mounting supports extending outwardly from the hub wherein each mounting support is located between two of the plurality of reeds.

5. The apparatus of claim 4 wherein the oscillation means comprises at least two piezoelectric elements.

6. The apparatus of claim 5 wherein the plurality of reeds is at least three reeds.

7. The dither motor of claim 4 wherein the plurality of reeds is at least three reeds.

8. The dither motor of claim 7 wherein the means for oscillating comprises at least two piezoelectric elements wherein the piezoelectric elements are mounted in pairs on opposing surfaces of each reed.

9. The dither motor of claim 4 wherein the outer support housing has a substantially circular shape.

10. The apparatus of claim 9 further including at least three mounting supports for ring laser gyros.

11. In an inertial measurement apparatus, including a plurality of discrete ring laser gyros, an improved dithering apparatus comprising:
   (a) means for simultaneously dithering each of the plurality of discrete ring laser gyros wherein the dithering means includes an outer ring which surrounds the plurality of ring laser gyros, the dithering means further includes a hub member having a plurality of mounting surfaces, and each of the plurality of ring laser gyros are mounted to one of the mounting surfaces; and
   (b) wherein the dithering means further includes a plurality of dither motor reeds and each dither motor reed has a robust inner section having a hub end, and an integrally connected outer section having a support end, wherein the hub ends of each robust inner section are connected to the hub member and the support ends of each outer section are connected to the outer support housing wherein the plurality of reeds are arranged to be disposed at equal angles from each other extending radially outwardly from the hub and wherein each reed has a means for oscillating connected thereto.

12. The apparatus of claim 11 wherein the plurality of dither motor reeds is at least three reeds.

13. The apparatus of claim 11 wherein the means for oscillating comprises a piezoelectric element.

14. The apparatus of claim 12 wherein the means for oscillating comprises a piezoelectric element.

15. The dither motor of claim 11 wherein the outer support housing has a substantially circular shape.

* * * * *